Patented Oct. 15, 1929

1,731,476

UNITED STATES PATENT OFFICE

EARL P. STEVENSON, OF NEWTON, MASSACHUSETTS, ASSIGNOR TO ARTHUR D. LITTLE, INCORPORATED, OF CAMBRIDGE, MASSACHUSETTS, A CORPORATION OF MASSACHUSETTS

PROCESS FOR TREATING CITRUS FRUITS FOR THE RECOVERY OF PRODUCTS THEREOF

No Drawing. Application filed May 4, 1928. Serial No. 275,259.

This invention relates to the economic utilization of citrus fruit crops. Overplusses of good growing seasons, fruit not classifiable under the somewhat rigid regulations of the market for fruit as fruit, and other conditions often make it desirable to convert large quantities of oranges, lemons, limes or grapefruit, especially lemons into their well-known extractive products, for example, the lemon oil of the yellow cells of the peel, pectin of the albedo or inner layer of the peel, and the citric acid of the interior cell juice. As heretofore practiced, operations on the fruit have not avoided the detrimental treatment of one or the other of the portions of the fruit capable of treatment for the recovery of the oil, the pectin, or the citric acid.

One object of this invention is to so treat the citric fruit to recover in optimum condition the several parts of the fruit relied upon for the essential oil, the pectin and the citric acid. Another object of the invention is to provide for performing a separation of the respective portions of the fruit in a thorough and effective way with the least expense of time and labor and least mutual damage of the various parts of the fruit such as results from practices in the present art.

I have found by experiment that when citrus fruits are reduced to a hard brozen condition, as will result from treatment in a gaseous or liquid envelopment, at temperatures ranging down to 0° F or lower, the frozen fruit will be altered in physical condition to an optimum state for performing the separations characteristic of this process. Before or after freezing the yellow cell layer of the surface of the fruit containing the oil of the peel may be mechanically removed, for example by treatment in a suitable grating or abrading machine. Some advantages of speed, thoroughness and dependable accuracy in removing the yellow peel layer only are found to result from treating the fruit in a frozen condition. According to present practices, it is essential to have the yellow cell layer attached to the albedo layer in order to avoid the disintegration of the albedo layer into a gelatinous mass under the hydration treatment for the selective removal of its pectin contents. Such gelatinous masses are difficult to handle and can not be filtered for the separation therefrom of their soluble constituents.

If now, while the fruit is still in a frozen condition it is subjected to impact, for example by treatment in a mill of the rock crushing type or in an impact mill, the albedo or white peeling layer breaks off of the cell segments in relatively large pieces, whereas the frozen cell contents are reduced to a granular state, the frozen cell walls everywhere separating.

If now, while maintaining the hard frozen condition the product of the crushing or impact breaking operation is subjected to screening or other means for the thorough separation of the acid juice cells from the pectin containing albedo, there is a dry segregation of the juice from the albedo.

Contrary to generally held opinion no loss of volume or quality of the acid contents of the juice cells results from this treatment, provided that the albedo is separated from the juice cell structure before the juice cells are allowed to thaw to a liquid condition. On the other hand, each of the juice cells having been ruptured under the expansion of freezing, it is not necessary to crush the pulp further, or to soak out the citric juice by added water, and the recovered juice on thawing is concentrated, unaltered chemically, and in a most favorable condition for any customary treatment for the recovery of citric acid.

As compared with the well-known process in which the whole fruit is crushed or pressed and the peel saturated with the fruit juice, the recovery of citric acid by this process shows large economies. The fruit juice is recovered in a concentrated form, as the dilutions incident to washing the peel with water as in the present procedure are entirely avoided. Also the recovery is more complete, since there are obvious practical limitations to completely washing out the juices absorbed by the peel. The concentrated juices can be processed for the recovery of this citric acid content in the same manner as at present, which involves the steps of preparing a clear juice by filtering off the juice cell pulp, precipitating the citric acid as calcium citrate, filtering, decomposing the calcium citrate, as with sulfuric acid, to regenerate the citric acid, concentration of the recovered citric acid solution by evaporation, and finally crystallization at reduced temperatures.

The advantages of the preparatory steps include the optimum condition in which the albedo peel contents are prepared for treatment for the recovery of pectin, which is contained therein in the form of protopectin, which is apparently a methyl ester of a condensation or polymerization product of pectin acid combined with cellulose.

A recommended first stage of the treatment of the pectin containing albedo is drying to desiccation under moderate conditions of heat, as in a current of warm air; but it will be observed that whether or not there is a drying operation concomitant with raising the temperature to thaw, the albedo is recovered with only its natural contents of moisture and without any invasion either by the oil or by the acid juice of the juice cells. The peel as prepared by this process can be processed by present equipment and procedure in which the essential step is the controlled partial hydrolysis of the proto-pectin to render the same extractable by hot water. If the hydrolysis, the ultimate products of which are methyl alcohol, pectic acid and cellulose, is carried too far, an inferior grade of pectin of low jelly strength results, and it is therefore desirable to have the peel in condition where pectin of maximum jelly strength can be recovered. The relatively dry peel, uncontaminated with juice, as secured by this process, is in a preferred condition for treatment to secure a high yield of pectin of maximum jelly strength.

It is furthermore feasible and practical, having dried the peel, to hold it in storage, thereby securing the advantage of quite independent operations for the recovery of oil, pectin and citric acid. The botanical structure of the peel renders it capable of holding enormous quantities of water and in present practice the pressed peel from the step of washing with water to dissolve out the juice as absorbed when crushing the unfrozen fruit may contain as much as 90% of water, the drying out of which involves an almost prohibitive cost as reckoned on the net yield of pectin.

Aside from the above noted advantage to be secured by drying the peel to point of desiccation as in a current of warm air, this operation makes it possible to separate a more concentrated pectin solution. Also it is possible to treat, for the recovery of pectin, desiccated albedo which has been separated from the outside yellow layer of thick-walled cells containing the oil cavities. In the present process this is not possible, as albedo when separated from the tougher outside layer breaks down under mechanical and chemical action into a fine, highly hydrated pulp which can not be handled in filters, and from which pectin can not be separated. In addition, therefore, to the advantage incident to separating the peel from the juice cells, the process further makes feasible the segregation of pectin and oil-bearing layers of the peel, and in a form well adapted to the maximum recoveries of values contained in each. Apparently the desiccated cellulose of the albedo is sufficiently resistant to rehydration to prevent its conversion into a gelatinous material in the course of hydrolyzing the protopectin, resulting in an improved certainty and economy in the treatment of the protopectin, as compared with any treatment in which the albedo has been soaked in the juice of the fruit as a result of warm crushing operations, or has been invaded by the oil of the yellow layer. Segregation of the oil and the pectin bearing layers avoids damage of the oil by partial solution of the citral of its contents in the juice of the juice cells.

It will now be apparent that citrus fruit separated into its parts by this process results in an oil cell product, an albedo product and a juice product, each in optimum condition for treatment to recover the essential oil, pectin and the citric acid respectively.

I claim:

1. Process of preparing derivatives from citrus fruit comprising as steps freezing the fruit to a hard state, crushing the frozen fruit to break apart its peel and the remainder of the fruit, and separating the peel from the remainder of the fruit.

2. Process of preparing derivatives from citrus fruit comprising as steps freezing the fruit to a hard state, crushing the frozen fruit to break apart its peel and the remainder of the fruit, and to separate from each other the juice cells, and separating the peel from the remainder of fruit while frozen.

3. Process of preparing derivatives from citrus fruit comprising as steps completely freezing the fruit and subjecting the frozen fruit to breakage by impact acting to break the peel away from the juice cells.

4. Process of preparing derivatives from citrus fruit comprising as steps, removing the oil cell layer of the peel, completely freezing the fruit, and subjecting the frozen fruit to breakage by impact acting to break the peel away from the juice cells.

5. Process of preparing derivatives from citrus fruit comprising as steps completely freezing the fruit, removing the oil cell layer of the peel and subjecting the frozen fruit to breakage by impact acting to break the peel away from the juice cells, and to separate the frozen juice cells, and separating the frozen peel fragments from the frozen juice cells.

Signed by me at Cambridge, Massachusetts, this first day of May, 1928.

EARL P. STEVENSON.